United States Patent [19]
Wang

[11] Patent Number: 6,046,112
[45] Date of Patent: Apr. 4, 2000

[54] CHEMICAL MECHANICAL POLISHING SLURRY

[75] Inventor: Ying-Lang Wang, Taichung, Taiwan

[73] Assignee: Taiwan Semiconductor Manufacturing Company, Hsin-Chu, Taiwan

[21] Appl. No.: 09/211,273

[22] Filed: Dec. 14, 1998

[51] Int. Cl.[7] .................................................. H01L 21/00
[52] U.S. Cl. .......................... 438/693; 216/89; 252/79.5; 438/745
[58] Field of Search ................... 216/38, 88, 89; 252/79.1, 79.5; 438/691, 692, 693, 745, 747; 106/3

[56] References Cited

U.S. PATENT DOCUMENTS

| | | | |
|---|---|---|---|
| 5,154,023 | 10/1992 | Sioshansi | 51/223 |
| 5,468,326 | 11/1995 | Cuomo et al. | 156/345 |
| 5,480,476 | 1/1996 | Cook et al. | 106/3 |
| 5,525,191 | 6/1996 | Maniar et al. | 156/636.1 |
| 5,614,444 | 3/1997 | Farkas et al. | 438/693 |
| 5,704,987 | 1/1998 | Huynh et al. | 134/6 |
| 5,733,819 | 3/1998 | Kodama et al. | 438/692 |
| 5,962,343 | 10/1999 | Kasai et al. | 438/693 |

*Primary Examiner*—William Powell
*Attorney, Agent, or Firm*—George O. Saile; Stephen B. Ackerman

[57] ABSTRACT

A CMP slurry comprising $ZrO_2$ particles and a surfactant, comprising TMAH (Tetra-Methyl-Ammonium Hydroxide) or TBAH (Tetra-Butyl-Ammonium Hydroxide) in a water solution is suitable for polishing low dielectric constant k siloxane based SOG layers at a high polish removal rate and with high selectivity over deposited silicon oxide layers. Polish removal rates of up to 4000 Angstroms/min. are achieved at a selectivity ratio as high as 8.

12 Claims, 5 Drawing Sheets

CHEMICAL MECHANICAL POLISHING SLURRY

BACKGROUND OF THE INVENTION (1) Field of the Invention

This invention relates to semiconductor devices, and in particular, to CMP (Chemical Mechanical Polishing) of semiconductor substrates.

(2) Description of Related Art

In the fabrication of integrated circuits, semiconductor substrate surface planarity is of extreme importance. CMP (Chemical Mechanical Polishing) has been developed to produce smooth topographies on surfaces deposited on semiconductor substrates. Rough topography results when metal conductor lines are formed over a surface containing device circuitry. The metal conductor lines serve to interconnect discrete devices to form integrated circuits. The metal conductor lines are further insulated from the next interconnection level by thin layers of insulating material and holes formed through the insulating layers provide electrical access between successive conductive interconnection layers. In such wiring processes, it is necessary that the insulating layers have a smooth topography, because it is difficult to lithographically image and pattern layers applied to rough surfaces.

Briefly, the CMP processes involve holding and rotating a thin, flat semiconductor substrate against a wetted polishing surface under controlled chemical, pressure and temperature conditions. A chemical slurry containing a polishing agent, such as alumina or silica, is used as the abrasive material. Additionally, the chemical slurry contains selected chemicals which etch various surfaces of the substrate during processing. The combination of mechanical and chemical removal of material during polishing results in superior planarization of the polished surface.

Further, as integrated circuit device dimensions and device spacings decrease to less than 1 micron, device performance is severely impacted by the electrical properties of the insulating material used to separate the devices. For conductor line spacings less than 1 micron the RC (Resistance×Capacitance) circuit signal delay time increases rapidly. And for conductor line spacings less than 0.5 micron the RC delay becomes a critical limiting factor for the performance of the integrated circuit. Methods to alleviate the RC delay problem include using conductive materials having lower intrinsic resistivity and using insulating materials which have lower dielectric constants. As new conductive and insulating materials and new combinations of conductive and insulating materials are developed the requisite processes for fabricating the integrated circuits are challenged.

One of the most effective ways to alleviate the RC delay problem is to use low dielectric constant Spin-On-Glass (low-k SOG) materials for the interlevel insulating material. Siloxane based SOG is a class of low-k dielectric materials which has excellent gap-filling capability and reliability compatibility with semiconductor integrated circuits. The dielectric constant for SOG derived from methyl-siloxane is 3.8, compared to a dielectric constant between 6 and 8 for deposited silicates. And, the dielectric constant for SOG derived from methyl-silsesquloxane is 2.7. However, state-of-the-art CMP processes utilizing conventional KOH based CMP slurries using alumina or silica as the abrasive material are not effective for polishing the low-k siloxane based SOG materials. For example, when using a conventional KOH based CMP slurry containing silica abrasive particles the polish removal rate for siloxane based SOG materials is between about 130 and 250 Angstroms/min., compared to about 1150 Angstroms/min. for the polish removal rate of silicate layers deposited by plasma processes. Therefore, there is an ongoing challenge to develop new CMP processes and new CMP polishing slurries to effectively and efficiently polish low-k siloxane based SOG materials.

While numerous improved CMP methods have been developed, as shown in the following U.S. Patents, these methods are not suitable for polishing low-k siloxane based SOG materials at a high removal rate. U.S. Pat. No. 5,733,819 entitled "Polishing Composition" granted Mar. 31, 1998 to Hitoshi Kodama et al describes a CMP slurry for polishing silicon dioxide. The slurry comprises silicon nitride fine powder, water and an acid and further additions of titania, zirconia, alumina or silica.

U.S. Pat. No. 5,704,987 entitled "Process For Removing Residue From A Semiconductor Wafer After Chemical-Mechanical Polishing" granted Jan. 6, 1998 to Cuc Kim Huynh et al describes a method for cleaning the surface of a semiconductor wafer after CMP. Residual slurry particles adhered to the wafer surface are removed by changing the oxide surface to hydrophilic, using TMAH (Tetra-Methyl-Ammonium Hydroxide) as a surfactant.

U.S. Pat. No. 5,468,326 entitled "Apparatus For Polishing A Diamond Or Carbon Nitride Film By Reaction With Oxygen Transported To The Film Through A Superionic Conductor In Contact With The Film" granted Nov. 21, 1995 to Jerome J. Cuomo et al describes a static method of polishing a diamond or carbon nitride film, in which a yttria-stabilized zirconia layer or, alternately, a zirconia layer is placed in contact with the diamond or carbon nitride film in the presence of oxygen.

U.S. Pat. No. 5,525,191 entitled "Process For Polishing A Semiconductor Substrate" granted Jun. 11, 1996 to Papu D. Maniar et al describes a zirconium dioxide based polishing slurry in which the pH of the slurry is adjusted by changing or adding potassium hydroxide or ammonium hydroxide to the slurry.

U.S. Pat. No. 5,480.476 entitled "Activated Polishing Compositions" granted Jan. 2, 1996 to Lee M. Cook et al shows activated polishing slurries, which contain silica, zirconia, water and ammonium hydroxide, and are prepared by a co-milling process.

U.S. Pat. No. 5,154,023 entitled "Polishing Process For Refractory Materials" granted Oct. 13, 1992 to Piran Sioshansi teaches a process for polishing materials such as diamond, sapphire, ruby and $Si_3N_4$, in which the surface is pre-softened by ion implantation, followed by mechanical polishing with an abrasive compound containing natural diamond, corundum, SiC, $Al_2O_3$, ZrO, MgO, $Cr_2O_3$, or $Fe_2O_3$.

The present invention is directed to a novel method of CMP of low-k siloxane based SOG materials using a CMP slurry containing $ZrO_2$ as the polishing abrasive and a surfactant such as TMAH (Tetra-Methyl-Ammonium Hydroxide) or TBAH (Tetra-Butyl-Ammonium Hydroxide). The slurry composition and method of the present invention permits planarization of low-k siloxane based SOG materials at a high enough removal rate to make the CMP process efficient and practical for use in the fabrication of multilevel semiconductor integrated circuits. The CMP slurry composition and method of the present invention improves the polish removal rate of low-k siloxane based SOG materials to 4000 Angstroms/min., compared to a polish removal rate of 170 Angstroms/min. when using a conventional KOH based CMP slurry containing silica particles. The CMP slurry composition and method of the present invention, also, achieves a CMP selectivity ratio as high as 8, where the CMP selectivity ratio is the ratio of the polish removal rate of low-k siloxane based SOG to the polish removal rate of deposited silicon oxide. Achievement of this high CMP selectivity ratio permits deposited silicon oxide to act as a polish stop layer in the CMP process for planarizing low-k siloxane based SOG insulators.

SUMMARY OF THE INVENTION

It is a general object of the present invention to provide an improved CMP polishing slurry which is effective for polishing low-k siloxane based SOG materials, as used for dielectric insulation in semiconductor integrated circuits.

A more specific object of the present invention is to provide an improved CMP polishing slurry which polishes low-k siloxane based SOG materials at a removal rate which is sufficiently high to be used as a cost-effective process for planarization of the low-k siloxane based SOG materials in the fabrication of multilevel semiconductor integrated circuit device structures.

Another object of the present invention is to provide an improved CMP polishing slurry which polishes low-k siloxane based SOG materials selectively compared to deposited silicon oxide.

And yet another object of the present invention is to provide an improved CMP method which utilizes the improved CMP slurry for polishing and planarizing low-k siloxane based SOG materials.

In accordance with the present invention, the above and other objectives are realized by a CMP slurry composition suitable for polishing low-k siloxane based SOG layers, said CMP slurry composition comprising $ZrO_2$ particles and a surfactant, comprising TMAH (Tetra-Methyl-Ammonium Hydroxide) or TBAH (Tetra-Butyl-Ammonium Hydroxide) in a water solution.

Also, in accordance with the present invention, the above and other objectives are realized by a CMP method for polishing a layer of siloxane based SOG on a semiconductor substrate, comprising the steps of: providing a semiconductor substrate having a layer of siloxane based SOG material thereon; and chemical mechanical polishing the layer of siloxane based SOG material using a polishing slurry comprising $ZrO_2$ particles and a surfactant, comprising TMAH (Tetra-Methyl-Ammonium Hydroxide) or TBAH (Tetra-Butyl-Ammonium Hydroxide) in a water solution.

BRIEF DESCRIPTION OF THE DRAWINGS

The object and other advantages of this invention are best described in the preferred embodiments with reference to the attached drawings that include.

DESCRIPTION OF THE PREFERRED EMBODIMENTS

The new and improved CMP slurry for polishing low-k siloxane based SOG materials and its method of use will now be described in detail.

Alkyl siloxane based low-k SOG layers with varying amounts of organic content were subjected to chemical mechanical polishing using slurries containing silica, $SiO_2$, or zirconia, $ZrO_2$, and a variety of additives. As the amount of organic content in SOG increases, the polish removal rate decreases when using a KOH based slurry containing silica. The dielectric constant k for the deposited silicate and the thermal oxide is between about 6 and 8. The dielectric constant for the siloxane based SOG is between about 2.7 and 3.8. The polish removal rate data are shown in Table 1.

TABLE 1

| Dielectric Material | CMP Rate Using Conventional KOH Silica Slurry |
| --- | --- |
| Deposited Silicate | 1150 Å/min. |
| Thermal oxide | 800 Å/min. |
| Methyl-silsesquloxane SOG | 250 Å/min. |
| Methyl-siloxane SOG | 170 Å/min. |

Polish removal rates of 100–200 Angstroms/min. are not efficient or practical for planarization of siloxane based SOG. Therefore, conventional KOH silica slurry is not suitable for application to planarization of siloxane based SOG.

On the other hand, when using a zirconia based CMP slurry the polish removal rate is increased for siloxane based SOG compared to deposited silicate or thermal oxide. These data are shown in Table 2.

TABLE 2

| Dielectric Material | CMP Rate Using Zirconia Slurry |
| --- | --- |
| Deposited Silicate | 900 Å/min. |
| Thermal oxide | 1350 Å/min. |
| Methyl-siloxane SOG | 2750 Å/min. |
| Methyl-siloxane SOG | 2200 Å/min. |

And, addition of a surfactant, such as TMAH (Tetra-Methyl-Ammonium Hydroxide) or TBAH (Tetra-Butyl-Ammonium Hydroxide) to a zirconia based slurry causes further enhancement of the polish removal rate of siloxane based SOG.

Figure 1A:
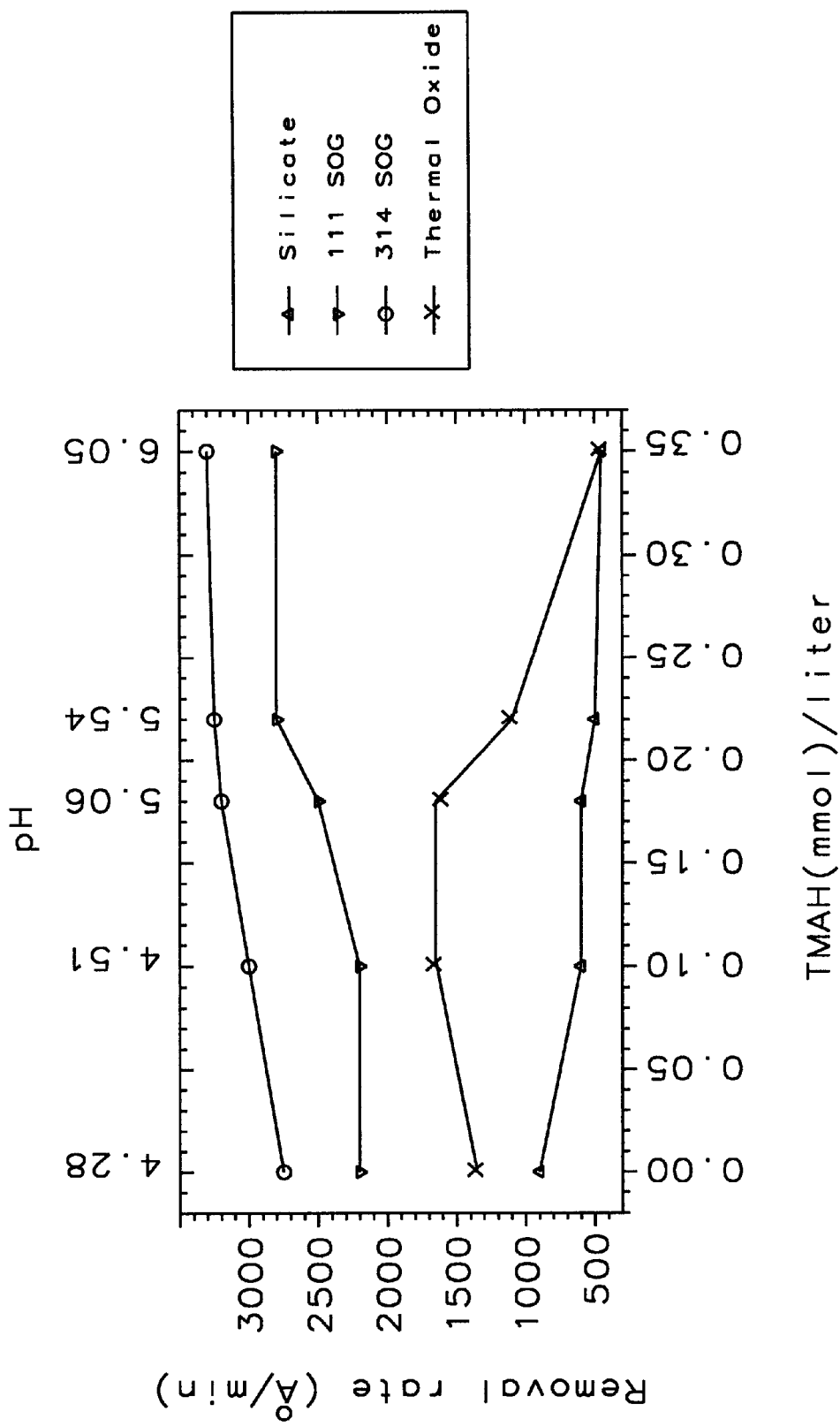
FIG. 1A is a graph showing Polish Removal Rate vs. Concentration of TMAH in a $ZrO_2$ based slurry.

Referring to FIG. 1A, which is a graph showing Polish Removal Rate vs. Concentration of TMAH in a $ZrO_2$ based slurry, it is shown that the addition of TMAH surfactant at a concentration of 0.35 mmol/liter causes the polish removal rate for siloxane based SOG (Samples 111 and 314) to increase to about 2600–3300 Angstroms/min. At the same time the polish removal rates for silicate and thermal oxide decrease to about 500 Angstroms/min., when using a zirconia based slurry containing 0.35 mmol/liter TMAH surfactant, and the polishing slurry becomes more selective to siloxane based SOG compared to silicate or thermal oxide.

Figure 1B:
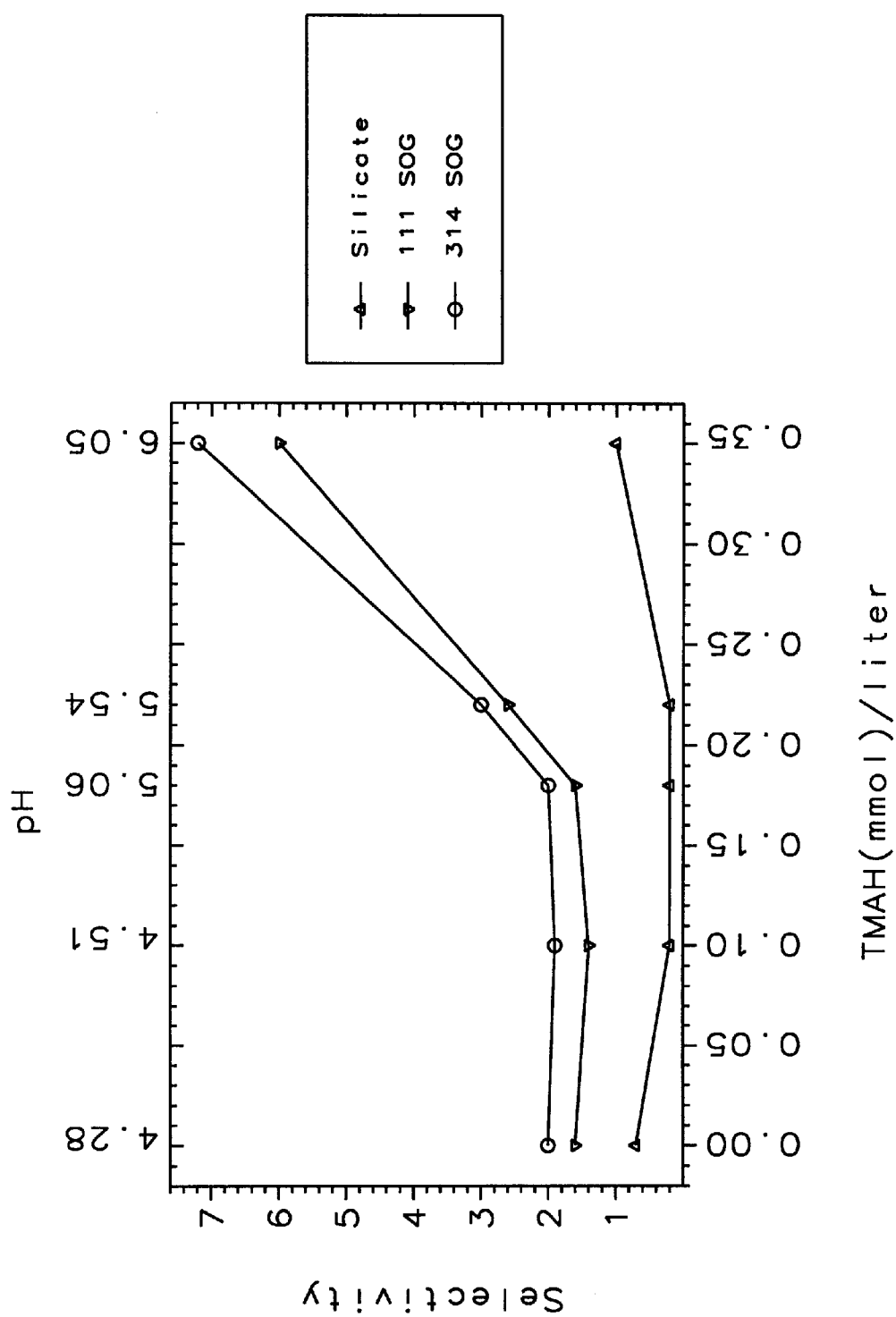
FIG. 1B is a graph showing Polish Removal Rate Selectivity vs. Concentration of TMAH in a $ZrO_2$ based slurry.

Referring to FIG. 1B, which is a graph showing Polish Removal Rate Selectivity vs. Concentration of TMAH in a $ZrO_2$ based slurry, it is shown that the selectivity for polish removal of siloxane SOG (Samples 111 and 314) increases markedly when TMAH surfactant additive has a concentration greater than about 0.20 mmol/liter and reaches about 6 to 7 when the TMAH surfactant additive has a concentration of 0.35 mmol/liter. Selectivity is defined as the ratio of the polish removal rate of a dielectric layer to the polish removal rate of thermal oxide. Selectivity is calculated by dividing the polish removal rate of the dielectric layer by the polish removal rate of thermal oxide at the same CMP conditions.

Figure 2A:
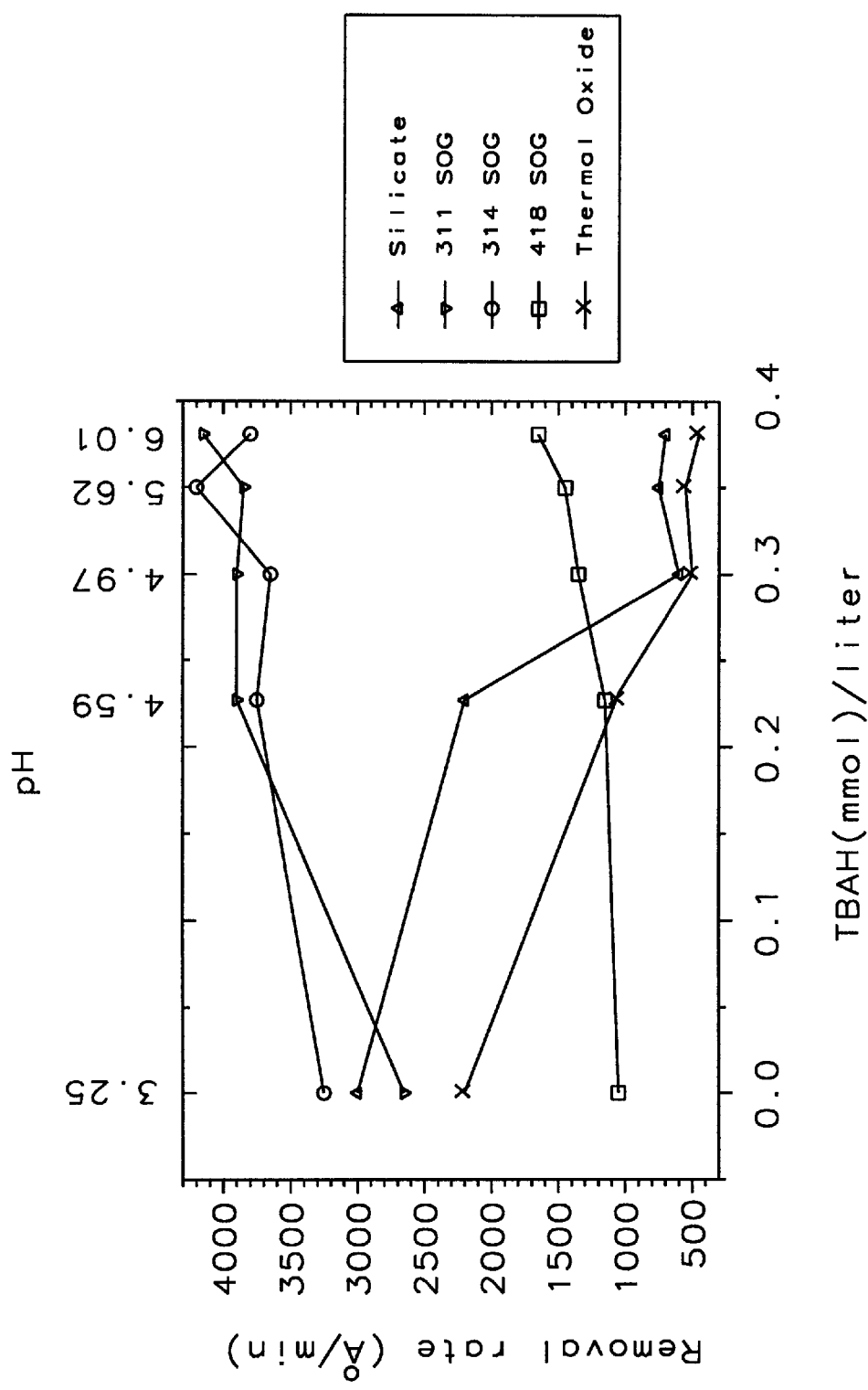
FIG. 2A is a graph showing Polish Removal Rate vs. Concentration of TBAH in a $ZrO_2$ based slurry.

Referring to FIG. 2A, which is a graph showing Polish Removal Rate vs. Concentration of TBAH in a $ZrO_2$ based slurry, it is shown that the addition of TBAH surfactant at a concentration greater than about 0.23 mmol/liter causes the polish removal rate for siloxane based SOG (Samples 311 and 314) to increase to about 3800–4200 Angstroms/min. The polish removal rate for silsesquloxane base SOG (Sample 418) increases from about 1000 Angstroms/min. to 1700 Angstroms/min. when the concentration of TBAH surfactant additive is increased from 0 to 0.38 mmol/liter. At the same time the polish removal rates for silicate and thermal oxide decrease to about 500–700 Angstroms/min., when using a zirconia based slurry containing greater than about 0.3 mmol/liter TBAH surfactant, and the polishing slurry becomes more selective to siloxane based SOG (Samples 311 and 314) compared to silicate or thermal oxide.

Figure 2B:
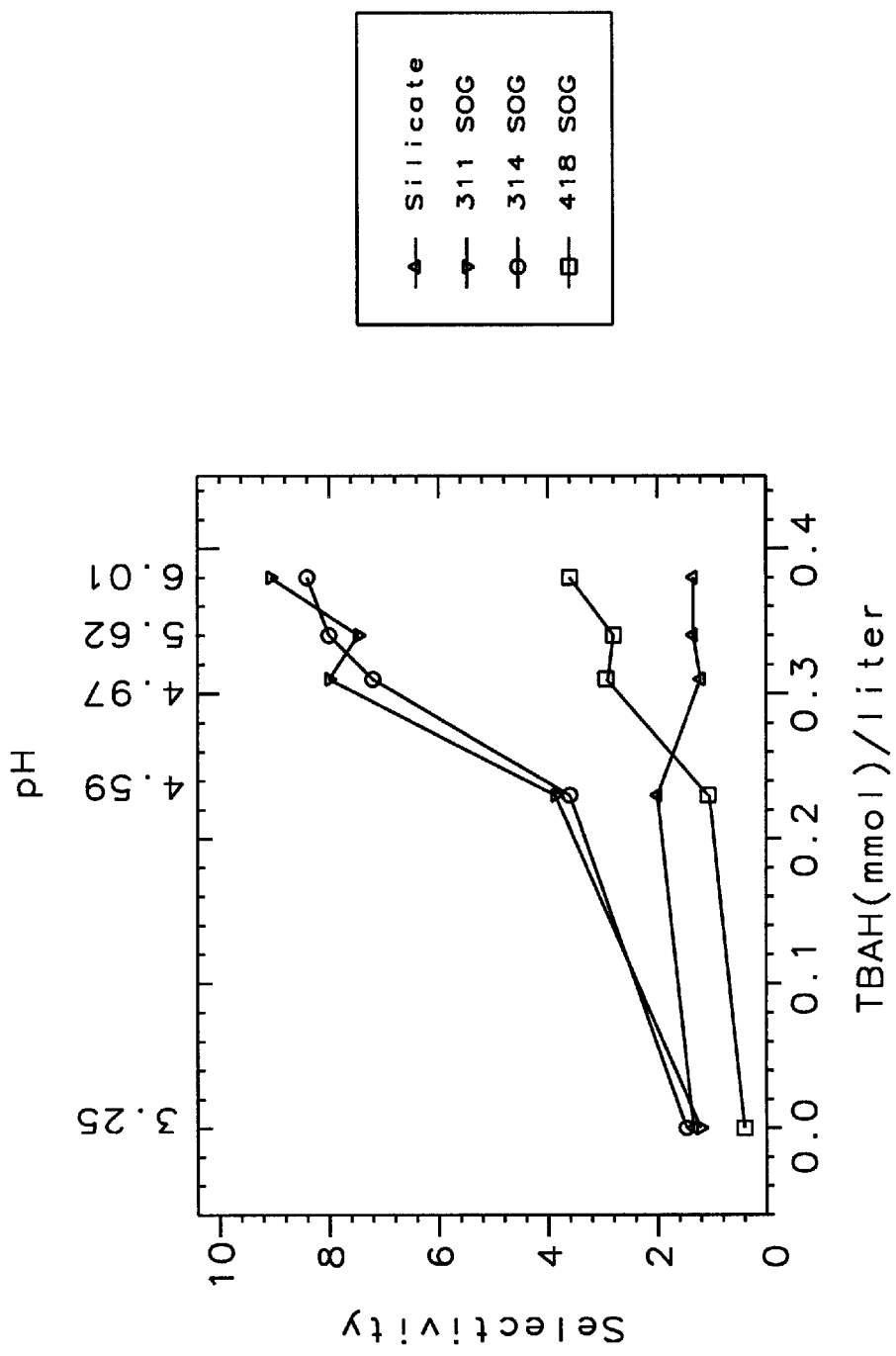
FIG. 2B is a graph showing Polish Removal Rate Selectivity vs. Concentration of TBAH in a $ZrO_2$ based slurry.

Referring to FIG. 2B, which is a graph showing Polish Removal Rate Selectivity vs. Concentration of TBAH in a $ZrO_2$ based slurry, it is shown that the selectivity for polish removal of siloxane SOG (Samples 311 and 314) increases markedly when TBAH surfactant additive has a concentration greater than about 0.20 mmol/liter and reaches about 8 when the TBAH surfactant additive has a concentration of about 0.38 mmol/liter. Again, selectivity is defined as the ratio of the polish removal rate of a dielectric layer to the polish removal rate of thermal oxide. And, selectivity is calculated by dividing the polish removal rate of the dielectric layer by the polish removal rate of thermal oxide at the same CMP conditions.

The present invention which is a CMP slurry composition comprising $ZrO_2$ particles and a surfactant, comprising TMAH or TBAH, in a water solution provides a practical and efficient means for polishing and planarization of siloxane based SOG layers having a low dielectric constant. In a first embodiment in which TMAH is added to the $ZrO_2/H_2O$ slurry solution, the concentration of TMAH should be between about 0.15 mmol per liter and 0.6 mmol per liter. The pH of the $ZrO_2/H_2O$ slurry solution with TMAH additive should be between about pH=2 and pH=6.

In a second embodiment in which TBAH is added to the $ZrO_2/H_2O$ slurry solution, the concentration of TBAH should be between about 0.2 mmol per liter and 0.6 mmol per liter. The pH of the $ZrO_2/H_2O$ slurry solution with TBAH additive should be between about pH=2 and pH=6.

Figure 3A:
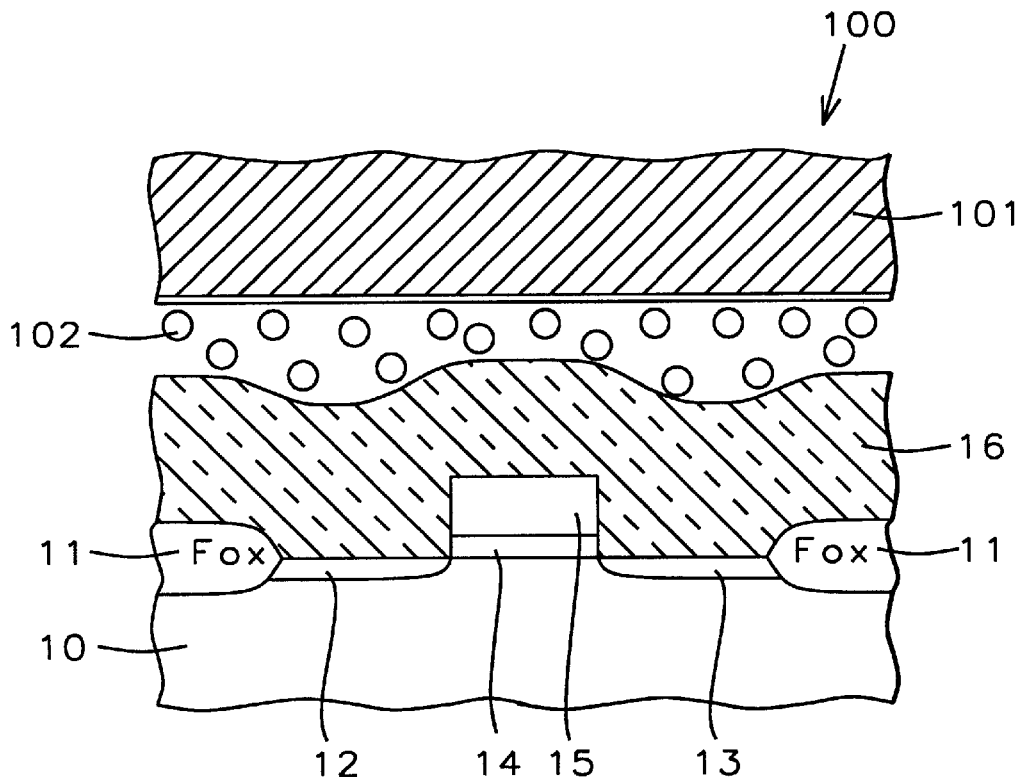
FIGS. 3A and 3B, which in cross-sectional representation illustrate the method of the present invention.
Figure 3B:
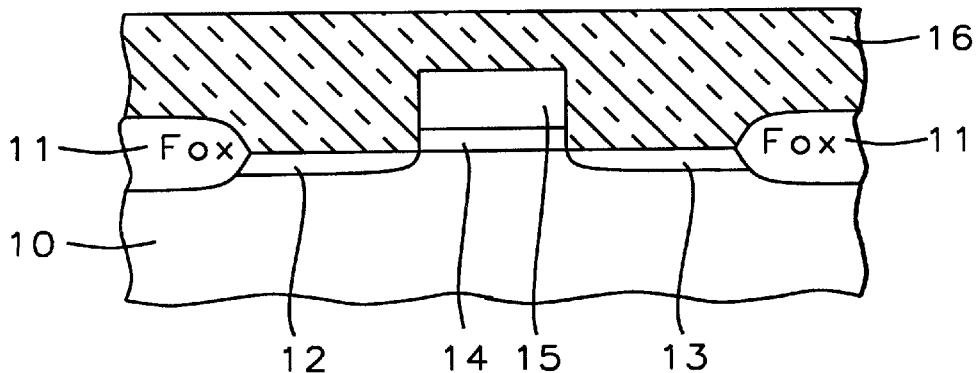

Use of the zirconia based slurry containing TMAH or TBAH surfactant additive for polishing and planarization of siloxane based low-k SOG is illustrated in FIGS. 3A and 3B, which in cross-sectional representation show a layer of siloxane based SOG formed on a portion of a semiconductor substrate containing a semiconductor device and the resultant planarization of the siloxane based SOG material after CMP using a polishing slurry comprising $ZrO_2$ particles and a surfactant, such as TMAH or TBAH in a water solution.

Referring to FIG. 3A, semiconductor substrate 10 contains field isolation regions 11, source region 12, and drain region 13 formed therein. A gate dielectric layer 14 and a gate electrode 15 are formed on semiconductor substrate 10. A layer of siloxane based low-k SOG 16 overlies the field isolation regions 11, source region 12, drain region 13 and the gate electrode 15. The siloxane based SOG may be derived from methyl-siloxane or methyl-silsesquloxane and has a thickness between about 3000 and 16,000 Angstroms. While spin-on-glass application techniques offer some degree of topography smoothing, their chief attribute is the ability to fill small gaps efficiently without voids. Therefore, the top surface of layer 16 generally replicates the topography of the underlying layers. It is desired that the layer of siloxane based low-k SOG 16 is to be polished so that its exposed surface is planarized.

The semiconductor substrate 10 is placed in a CMP apparatus 100 having a polishing pad 101, onto which is dispensed a polishing slurry 102 comprising $ZrO_2$ particles and a surfactant, such as TMAH (Tetra-Methyl-Ammonium Hydroxide) or TBAH (Tetra-Butyl-Ammonium Hydroxide) in a water solution. Polishing slurry 102 is illustrated as being spherical particles, but in fact is an aqueous solution containing $ZrO_2$ particles and a surfactant, such as TMAH or TBAH. Planarization of SOG layer 16, as illustrated in FIG. 3B, is achieved using conventional CMP methods of simultaneous pad and substrate rotations with pressure applied between the polishing pad and substrate in the presence of the CMP slurry composition comprising $ZrO_2$ particles and a surfactant, such as TMAH or TBAH in a water solution.

While the invention has been particularly shown and described with reference to the preferred embodiments thereof, it will be understood by those skilled in the art that various changes in form and details may be made without departing from the spirit and scope of the invention.

What is claimed is:

1. A CMP slurry composition suitable for polishing low-k siloxane based SOG layers, said CMP slurry composition comprising $ZrO_2$ particles and a surfactant, comprising TMAH or TBAH in a water solution.

2. The CMP slurry composition of claim 1, wherein the concentration of TMAH is between about 0.15 mmol per liter and 0.6 mmol per liter.

3. The CMP slurry composition of claim 1, wherein the concentration of TBAH is between about 0.2 mmol per liter and 0.6 mmol per liter.

4. The CMP slurry composition of claim 1, wherein said CMP slurry comprises $ZrO_2$ particles and TMAH surfactant in a water solution having a pH between about pH=2 and pH=6.

5. The CMP slurry composition of claim 1, wherein said CMP slurry comprises $ZrO_2$ particles and TBAH surfactant in a water solution having a pH between about pH=2 and pH=6.

6. A CMP method for polishing a layer of siloxane based SOG on a semiconductor substrate, comprising the steps of:
   providing a semiconductor substrate having a layer of siloxane based SOG material thereon; and
   chemical mechanical polishing said layer of siloxane based SOG material using a polishing slurry comprising $ZrO_2$ particles and a surfactant, comprising TMAH or TBAH in a water solution.

7. The CMP method of claim 6, wherein said layer of siloxane based SOG is derived from methyl-siloxane.

8. The CMP method of claim 6, wherein said layer of siloxane based SOG is derived from methyl-silsesquloxane.

9. The CMP method of claim 6, wherein said TMAH surfactant has a concentration between about 0.15 mmol per liter and 0.6 mmol per liter.

10. The CMP method of claim 6, wherein said TBAH surfactant has a concentration between about 0.15 mmol per liter and 0.6 mmol per liter.

11. The CMP method of claim 6, wherein said polishing slurry comprises $ZrO_2$ particles and TMAH surfactant in a water solution having a pH between about pH=2 and pH=6.

12. The CMP method of claim 6, wherein said polishing slurry comprises $ZrO_2$ particles and TBAH surfactant in a water solution having a pH between about pH=2 and pH=6.

* * * * *